United States Patent [19]

Nada

[11] Patent Number: 5,070,692
[45] Date of Patent: Dec. 10, 1991

[54] AIR-FUEL RATIO FEEDBACK CONTROL SYSTEM HAVING SINGLE AIR-FUEL RATIO SENSOR DOWNSTREAM OF OR WITHIN THREE-WAY CATALYST CONVERTER

[75] Inventor: Mitsuhiro Nada, Susono, Japan

[73] Assignee: Toyota Jidosha Kabushiki Kaisha, Toyota, Japan

[21] Appl. No.: 635,958

[22] Filed: Dec. 28, 1990

[30] Foreign Application Priority Data

Dec. 29, 1989 [JP] Japan .................. 1-340574

[51] Int. Cl.$^5$ .................. F01N 2/28
[52] U.S. Cl. .................. 60/274; 60/276
[58] Field of Search .................. 60/274, 276

[56] References Cited

U.S. PATENT DOCUMENTS

| | | | |
|---|---|---|---|
| 4,027,477 | 6/1977 | Storey | 60/276 |
| 4,153,023 | 5/1979 | Asano | 60/276 |
| 4,155,335 | 5/1979 | Hosaka | 60/276 |
| 4,167,924 | 9/1979 | Carlson | 60/276 |
| 4,817,384 | 4/1989 | Okumura et al. . | |
| 4,840,027 | 6/1989 | Okumura . | |
| 4,941,318 | 7/1990 | Matsuoka . | |

FOREIGN PATENT DOCUMENTS

| | | |
|---|---|---|
| 52-081438 | 7/1977 | Japan . |
| 56-023531 | 3/1981 | Japan . |
| 56-023532 | 3/1981 | Japan . |
| 56-023533 | 3/1981 | Japan . |
| 56-126647 | 10/1981 | Japan . |
| 56-126648 | 10/1981 | Japan . |
| 56-126649 | 10/1981 | Japan . |
| 56-126650 | 10/1981 | Japan . |
| 57-135243 | 8/1982 | Japan . |
| 58-048745 | 3/1983 | Japan . |
| 64-053042 | 3/1989 | Japan . |
| 64-066441 | 3/1989 | Japan . |
| 1-121538 | 5/1989 | Japan . |

Primary Examiner—Douglas Hart
Attorney, Agent, or Firm—Kenyon & Kenyon

[57] ABSTRACT

In an air-fuel ratio feedback system including a single air-fuel ratio sensor downstream of or within a three-way catalyst converter, a warming-up $O_2$ storage term $AF_{CCRO}$ is calculated in a warming-up mode, and a coarse-adjusting term $AF_C$ and an after-warming-up term $AF_{CCRO'}$ are calculated in an after-warming-up mode. The warming-up $O_2$ storage term $AF_{CCRO}$ is weakly dependent on an $O_2$ storage amount of the catalyst converter but the after-warming-up $O_2$ storage term $AF_{CCRO'}$ is strongly dependent on the $O_2$ storage amount of the catalyst converter.

18 Claims, 15 Drawing Sheets

Fig. 2 PRIOR ART
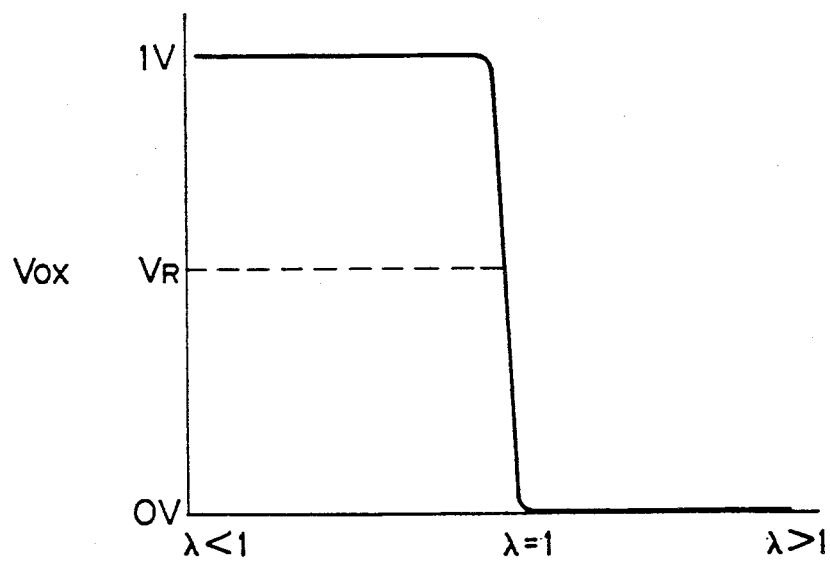
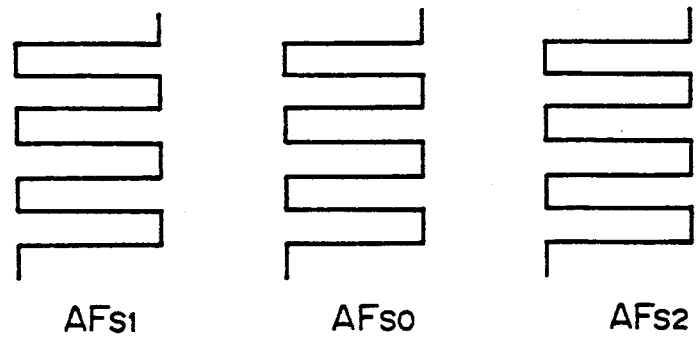
AFs1  AFs0  AFs2

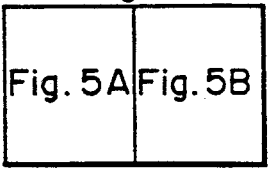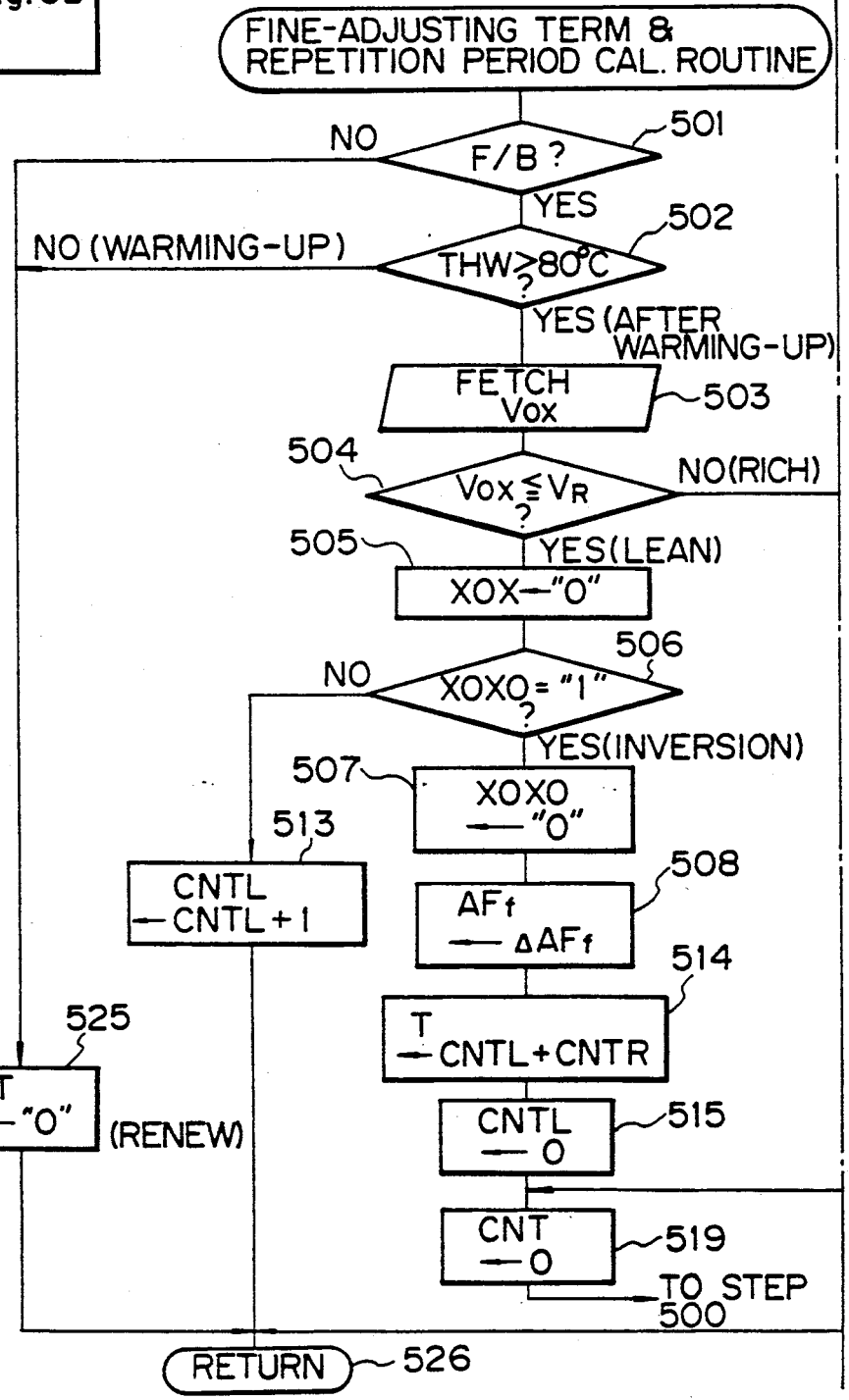

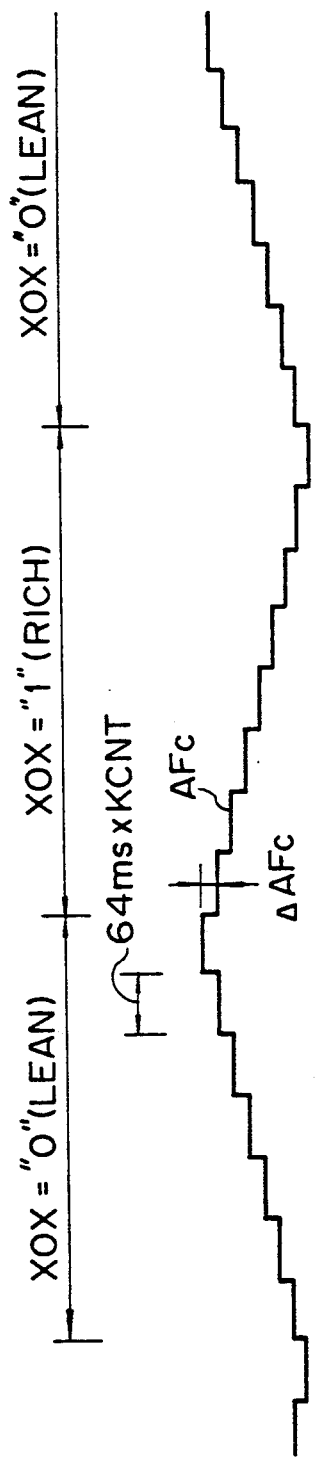

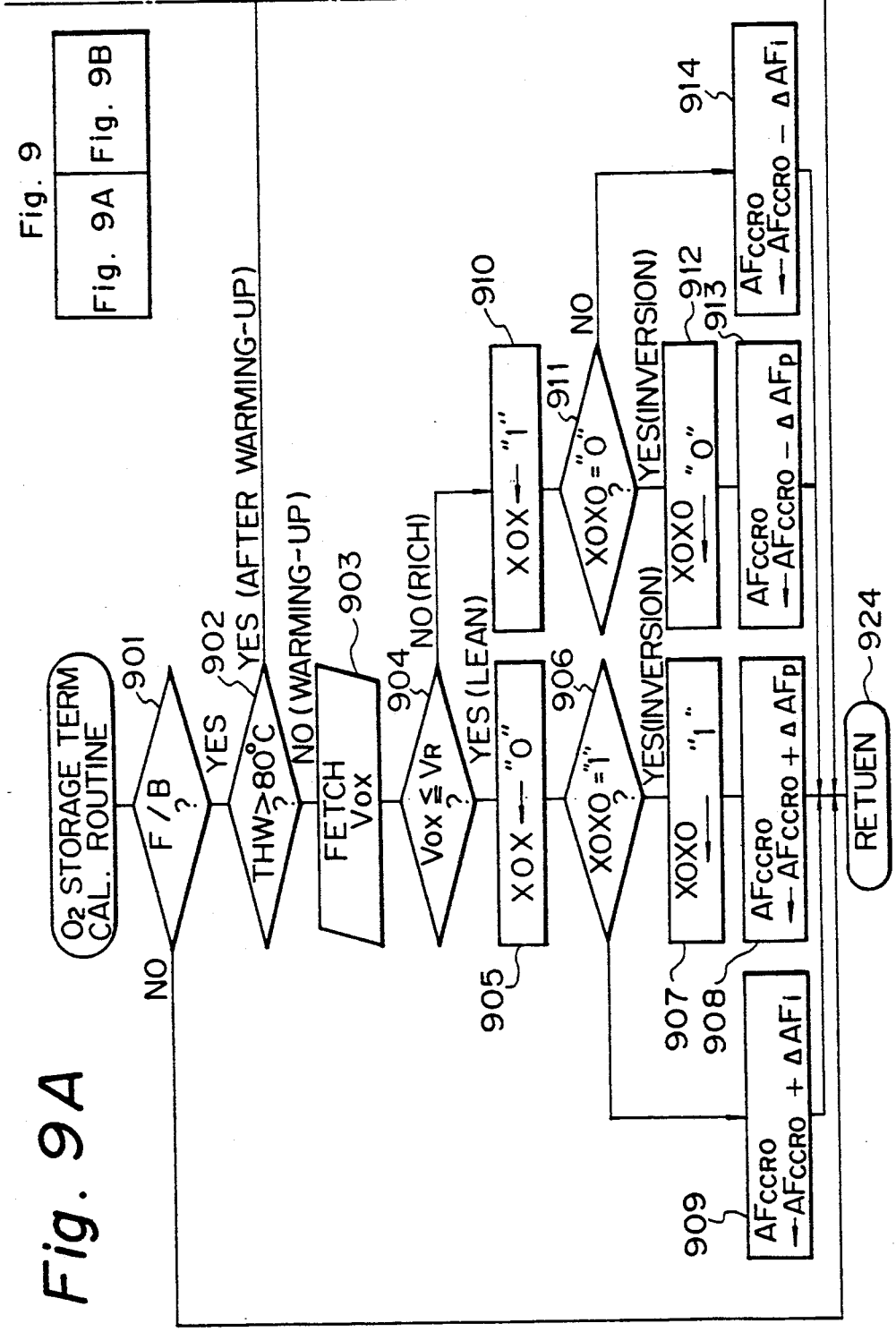

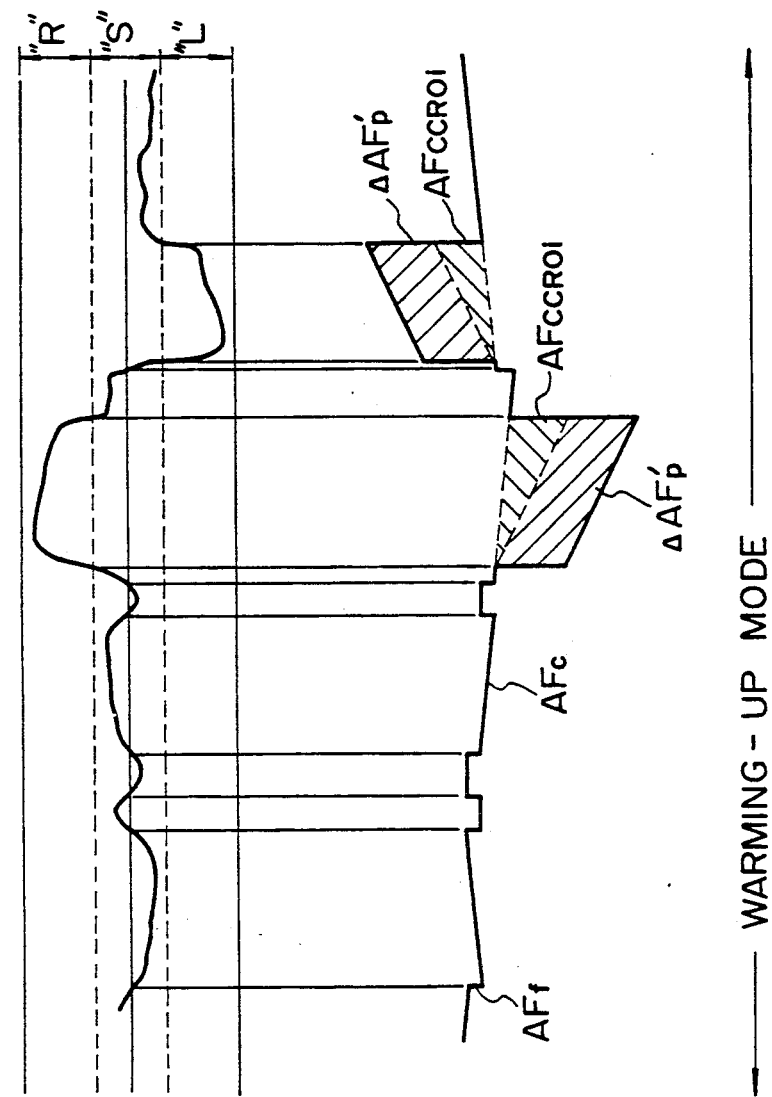

AIR-FUEL RATIO FEEDBACK CONTROL SYSTEM HAVING SINGLE AIR-FUEL RATIO SENSOR DOWNSTREAM OF OR WITHIN THREE-WAY CATALYST CONVERTER

BACKGROUND OF THE INVENTION

1. Field of the Invention

The present invention relates to an air-fuel ratio feedback control system in an internal combustion engine having a single air-fuel ratio sensor downstream of or within a three-way reducing and oxidizing catalyst converter within an exhaust gas passage.

2. Description of the Related Art

In known air-fuel ratio feedback control systems using air-fuel ratio sensors ($O_2$ sensors), there exist a single $O_2$ sensor system having a single $O_2$ sensor and a double $O_2$ sensor system having two $O_2$ sensors one upstream and one downstream of the catalyst converter. Note, in a single $O_2$ sensor system, the $O_2$ sensor is disposed either upstream or downstream of the catalyst converter.

In a single $O_2$ sensor system having an $O_2$ sensor upstream of the catalyst converter, the $O_2$ sensor is disposed in an exhaust gas passage near the combustion chamber, i.e., near the concentration portion of an exhaust manifold, upstream of the catalyst converter. In this system, however, the output characteristics of the $O_2$ sensor are directly affected by the non-uniformity or non-equilibrium of the exhaust gas. For example, when the air-fuel ratio actually indicates a rich state, but oxygen is still present, the output characteristics of the $O_2$ sensor fluctuate. Also, in an internal combustion engine having a plurality of cylinders, the output characteristics of the $O_2$ sensor are also directly affected by individual differences between the cylinders, and accordingly, it is impossible to detect the mean air-fuel ratio within the entire engine, and thus the accuracy of the controlled air-fuel ratio is low.

On the other hand, in a single $O_2$ sensor system having an $O_2$ sensor downstream of the catalyst converter, the non-uniformity or non-equilibrium of the detected exhaust gas can be eliminated, and the mean air-fuel ratio within the entire engine can be detected. In this system, however, due to the long distance between the $O_2$ sensor and the exhaust valves, and because the capacity and cleaning efficiency of the catalyst converter depends upon its $O_2$ storage effect, the response characteristics of the $O_2$ sensor are lowered, thus reducing the response characteristics of an air-fuel ratio feedback control system. As a result, the efficiency of the catalyst converter cannot be sufficiently exhibited, thus increasing HC, CO, and $NO_x$ emissions.

Also, in the above-mentioned double $O_2$ sensor system, an air-fuel ratio feedback control operation is carried out by the downstream $O_2$ sensor in addition to an air-fuel ratio feedback control operation by the upstream $O_2$ sensor. For example, the mean air-fuel ratio is detected by the downstream $O_2$ sensor to reflect an air-fuel ratio feedback parameter such as skip amounts, and the air-fuel ratio feedback control for the entire system is carried out by the output of the upstream $O_2$ sensor and the air-fuel ratio feedback control parameter (see U.S. Pat. No. 4,693,076). Therefore, even if the output characteristics of the downstream $O_2$ sensor are not stable, good emission characteristics are obtained. In this double $O_2$ sensor system, however, two $O_2$ sensors are required, thus increasing the manufacturing cost, and further, when the frequency of the air-fuel ratio feedback control by the upstream $O_2$ sensor is increased by the aging of the parts of the engine or the like, the efficiency of the catalyst converter is lowered.

In view of the foregoing, the present inventor has already suggested a single $O_2$ sensor system having a downstream $O_2$ sensor in which a self-oscillating term $AF_s$ having a definite amplitude and a definite period is generated, and a mean value (coarse-adjusting term) $AF_c$ of the self-oscillating term $AF_s$ is changed in accordance with the output of the downstream $O_2$ sensor, to thereby exhibit full efficiency of the catalyst converter (see Japanese Unexamined Patent Publication (Kokai) No. 64-66441 published on Mar. 31, 1989).

On the other hand, in a vehicle where the catalyst converter frequently cannot exhibit the required $O_2$ storage effect if the air-fuel ratio upstream of the catalyst converter is greatly deviated from the stoichiometric air-fuel ratio for a long time, the $O_2$ storage effect of the catalyst converter is different from that in a cruising state, and thus the $O_2$ storage effect cannot be ensured, thereby reducing the accuracy of the control of the air-fuel ratio. Accordingly, the present inventor also suggested the introduction of an $O_2$ storage term corresponding to the $O_2$ storage amount of the catalyst converter into the control of the air-fuel ratio (see U.S. Ser. No. 487454).

Nevertheless, even when the $O_2$ storage term is introduced into the control of the air-fuel ratio, it is impossible to compensate for the reduction of the $O_2$ storage effect of the catalyst converter in a warming-up mode, thus increasing HC and CO emissions in the warming-up mode.

That is, in the warming-up mode, a warming-up incremental fuel is supplied to the engine, to enrich the controlled air-fuel ratio, thus compensating for the friction of the engine. Also, in the warming-up mode, the amount of fuel adhered to the walls of an intake air passage and the like is so large that the controlled air-fuel ratio is remarkably rich even in an after-warming-up mode, i.e., an acceleration mode or a deceleration mode. Thus, in the warming-up mode and in the after-warming-up mode, the $O_2$ storage amount of the catalyst converter is remarkably reduced. When this remarkable reduction of the $O_2$ storage amount is compensated for by the introduction of the $O_2$ storage term $AF_{CCRO}$ into the control of the air-fuel ratio, the $O_2$ storage term $AF_{CCRO}$ on the lean side is cleared by a temporary lean output of the $O_2$ sensor in the warming-up mode, even if the controlled air-fuel ratio is originally rich, which will be later explained, and as a result, it is impossible for the controlled air-fuel ratio to reach a desired lean air-fuel ratio, to increase HC and CO emissions. Contrary to this, if the $O_2$ storage term $AF_{CCRO}$ is not cleared by the inversion of the output of the $O_2$ sensor, the convergence characteristics of the controlled air-fuel ratio in the after-warming-up mode are degraded.

SUMMARY OF THE INVENTION

An object of the present invention is to avoid the reduction of accuracy of the air-fuel ratio control due to the $O_2$ storage effect of the catalyst converter both in a warming-up mode and in an after-warming-up mode, to thus reduce the emissions.

According to the present invention, in an air-fuel ratio feedback system including a single air-fuel ratio sensor downstream of or within a three-way catalyst converter, a warming-up $O_2$ storage term $AF_{CCRO}$ is calculated on a warming-up mode, and a coarse-adjusting term $AF_c$ and an after-warming-up term $AF_{CCRO}$ are calculated in an after-warming-up mode. The warming-up $O_2$ storage term $AF_{CCRO}$ is weakly dependent on an $O_2$ storage amount of the catalyst converter, but the after-warming-up $O_2$ storage term $AF_{CCRO}'$ is strongly dependent on the $O_2$ storage amount of the catalyst converter. That is, two different types of $O_2$ storage terms $AF_{CCRO}$ and $AF'_{CCRO}$ for the warming-up mode and the after-warming-up mode are introduced into the control of the air-fuel ratio.

BRIEF DESCRIPTION OF THE DRAWINGS

The present invention will be more clearly understood from the description as set forth below with reference to the accompanying drawings.

FIG. 2 is a graph showing the relationship between a self-oscillating wave and a clearing function of a three-way catalyst converter;

FIGS. 5A, 5B, 5C, 7, 9A, 9B, 11, 12, and 13 are flow charts showing the operation of the control circuit of FIG. 4;

FIG. 8 is a timing diagram explaining the flow chart of FIG. 7; and

FIGS. 10A and 10B are timing diagrams explaining the flow charts of FIG. 9.

DESCRIPTION OF THE PREFERRED EMBODIMENTS

Figure 1A:
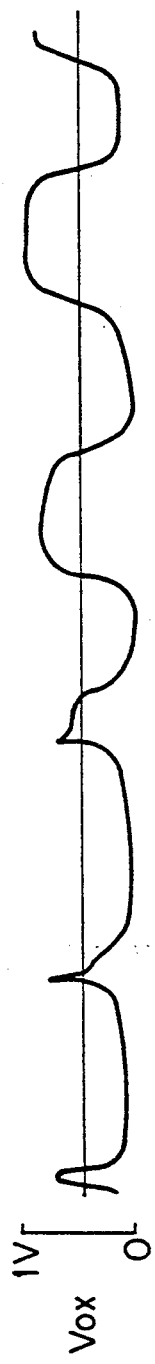
FIGS. 1A and 1B are timing diagrams showing the inventor's suggested single air-fuel sensor system.
Figure 1B:
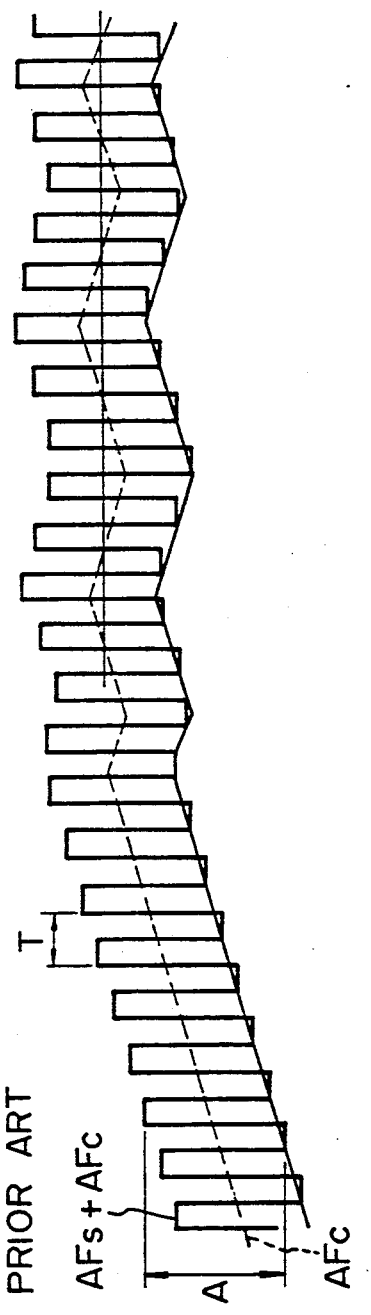

First, the inventor's suggested single air-fuel ratio sensor system having a single downstream $O_2$ sensor will be explained with reference to FIGS. 1A, 1B, and 2. When the output $V_{OX}$ of the downstream $O_2$ sensor is changed as shown in FIG. 1A, the center of the self-oscillating term $AF_s$ having a definite amplitude A and a definite period T, i.e., the coarse-adjusting term $AF_c$, is changed in accordance with the output $V_{OX}$ of the $O_2$ sensor. In this case, when the output $V_{OX}$ of the $O_2$ sensor indicates a lean state, the coarse-adjusting term $AF_c$ is gradually increased, and when the output $V_{OX}$ of the $O_2$ sensor indicates a rich state, the coarse-adjusting term $AF_c$ is gradually decreased; i.e., the coarse-adjusting term $AF_c$ is integrally controlled.

Referring to FIG. 2, when the self-oscillating term $AF_s (=AF_{s0})$ is oscillating around the stoichiometric air-fuel ratio ($\lambda=1$), the three-way catalyst converter exhibits a full cleaning function. When the self-oscillating term $AF_s$, which corresponds to $AF_{s1}$ or $AF_{s2}$ is oscillated around a rich air-fuel ratio ($\lambda<1$) or a lean air-fuel ratio ($\lambda>1$), the three-way catalyst converter cannot exhibit a full cleaning function. Therefore, to move the self-oscillating term $AF_{s1}$ or $AF_{s2}$ to $AF_{s0}$, the coarse-adjusting term (integration term) $AF_c$ is introduced into the control of the air-fuel ratio.

Figure 3:
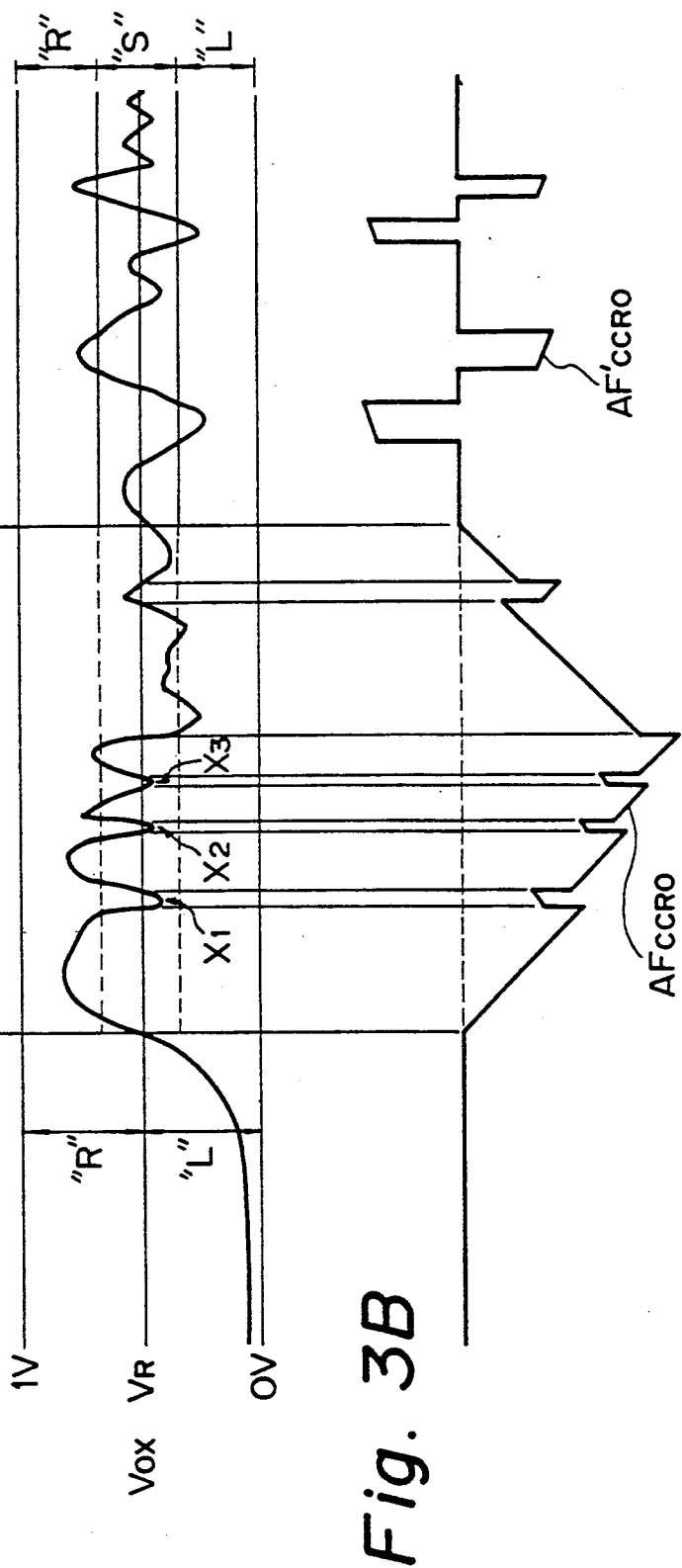
FIGS. 3A and 3B are timing diagrams explaining the present invention.

FIGS. 3A and 3B show the principle of the present invention. As shown in FIGS. 3A and 3B, in a warming-up mode, a warming-up $O_2$ storage term $AF_{CCRO}$ is calculated in accordance with the output $V_{OX}$ of the $O_2$ sensor, and in this case, the warming-up $O_2$ storage term $AF_{CCRO}$ is not cleared even when the output $V_{OX}$ of the $O_2$ sensor is inverted. Therefore, on a warming-up mode, even when the output $V_{OX}$ of the $O_2$ sensor temporarily indicates a lean level, as indicated by arrows $X_1$, $X_2$, and $X_3$, the $O_2$ storage term $AF_{CCRO}$ is maintained at a lean air-fuel ratio side. That is, the warming-up $O_2$ storage term $AF_{CCRO}$ is weakly dependent on the $O_2$ storage amount of the catalyst converter.

On the other hand, in an after-warming-up mode, an after-warming-up $O_2$ storage term $AF_{CCRO}$ reflects the $O_2$ storage amount of the catalyst converter. For example, the value of the after-warming-up $O_2$ storage term $AF_{CCRO}'$ corresponds to a level similar to the level of the output $V_{OX}$ of the $O_2$ sensor, which shows the $O_2$ storage amount of the catalyst converter. As a result, in an after-warming-up mode, even when the $O_2$ storage amount of the catalyst converter is fluctuated so that the controlled air-fuel ratio is deviated from the stoichiometric air-fuel ratio, the controlled air-fuel ratio is compensated immediately by the after-warming-up $O_2$ storage term $AF_{CCRO}'$. Note that, although a coarse-adjusting term $AF_c$, which is integrally changed in accordance with the output $V_{OX}$ of the $O_2$ sensor, is introduced into the control of the air-fuel ratio in an after-warming-up mode, the illustration of $AF_c$ is omitted in FIG. 3B for the simplicity of the description.

Figure 4:
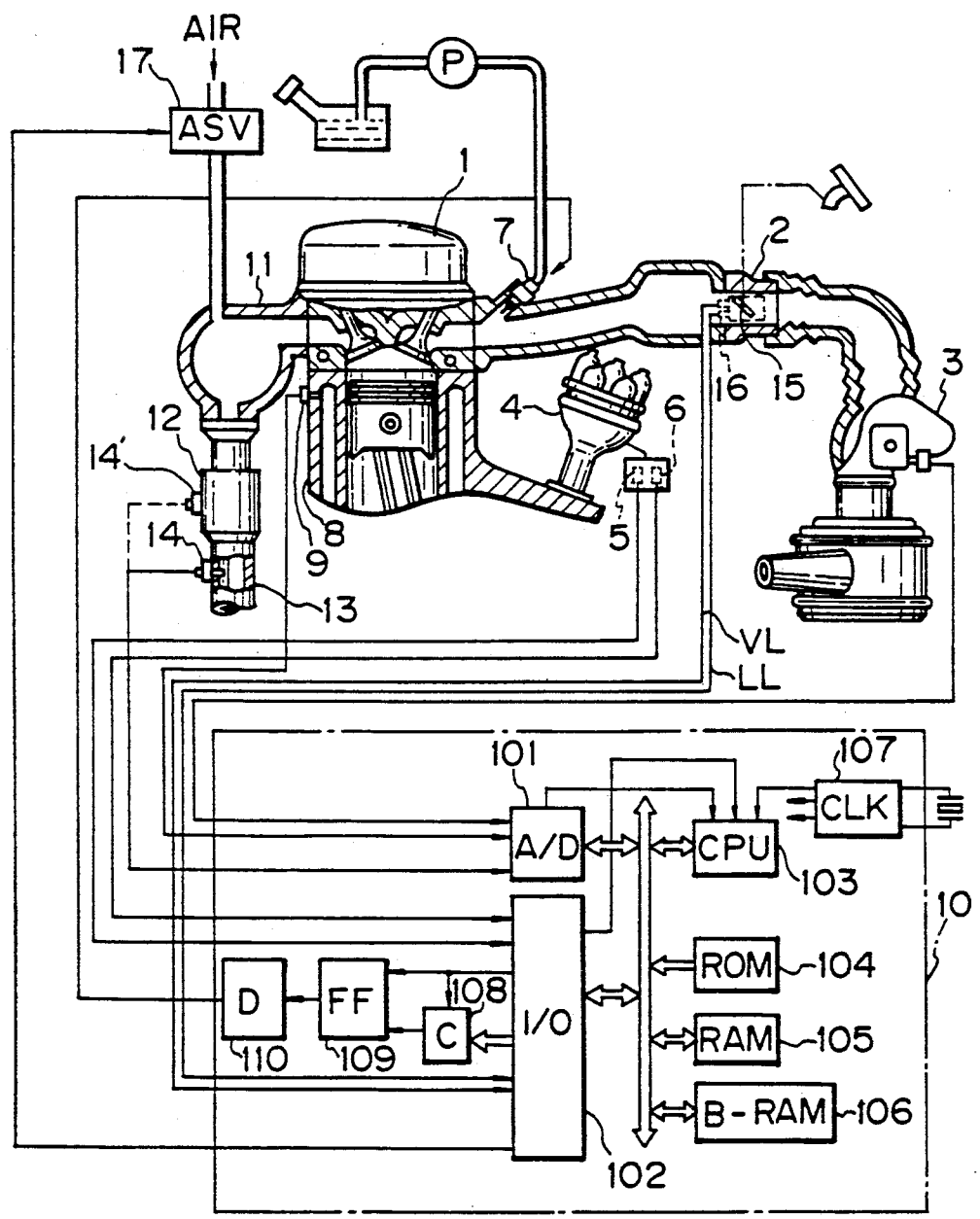
FIG. 4 is a schematic view of an internal combustion engine according to the present invention.

In FIG. 4, which illustrates an internal combustion engine according to the present invention, reference numeral 1 designates a four-cycle spark ignition engine disposed in an automotive vehicle. An air-intake passage 2 of the engine 1 is provided with a potentiometer-type airflow meter 3 for detecting the amount of air drawn into the engine 1, to generate an analog voltage signal in proportion to the amount of air flowing therethrough. The signal of the airflow meter 3 is transmitted to a multiplexer-incorporating analog-to-digital (A/D) converter 101 of a control circuit 10.

Disposed in a distributor 4 are crank angle sensors 5 and 6 for detecting the angle of the crank-shaft (not shown) of the engine 1.

In this case, the crank angle sensor 5 generates a generates a pulse signal at every 720° crank-angle (CA) and crank-angle sensor 6 generates a pulse signal at every 30° CA. The pulse signals of the crank angle sensors 5 and 6 are supplied to an input/output (I/O) interface 102 of the control circuit 10. Further, the pulse signal of the crank angle sensor 6 is then supplied to an interruption terminal of a central processing unit (CPU) 103.

Also provided in the air-intake passage 2 is a fuel injection valve 7 for supplying pressurized fuel from the fuel system to the air-intake port of the cylinder of the engine 1. In this case, other fuel injection valves are provided for other cylinders, but these are to shown in FIG. 4.

Disposed in a cylinder block 8 of the engine 1 is a coolant temperature sensor 9 for detecting the temperature of the coolant. The coolant temperature sensor 9 generates an analog voltage signal in response to the temperature THW of the coolant, and transmits that signal to the A/D converter 101 of the control circuit 10. .

Provided in an exhaust system on the downstream-side of an exhaust manifold 11 is a three-way reducing and oxidizing catalyst converter 12 which removes three pollutants CO, HC, and $NO_x$ simultaneously from the exhaust gas.

Provided in an exhaust pipe 13 downstream of the catalyst converter 12 is an $O_2$ sensor 14 for detecting the concentration of oxygen composition in the exhaust gas. The $O_2$ sensor 14 generates a output voltage signal and transmits the signal to the A/D converter 101 of the control circuit 10. Note that an $O_2$ sensor 14' can be located within the catalyst converter 12, instead of the $O_2$ sensor 14 downstream of the catalyst converter 12.

Reference 15 designates a throttle valve, and 16 designates an throttle sensor which incorporates an idle switch for detecting when the throttle valve 15 is fully closed, and a full switch for detecting whether or not the opening of the throttle valve 15 is larger than a predetermined value, such as 70°. The output LL of the idle switch and the output VL of the full switch are supplied to the I/O interface 102 of the control circuit 10.

Reference 17 designates an air suction valve of a secondary air supply system. When the engine is in a predetermined deceleration state or an idling state, the air suction valve 17 is opened to introduce secondary air into the exhaust manifold 11, thus reducing the HC and CO emissions. Also, when the coolant temperature THW is low, the air suction valve 17 is closed to stop the introduction of secondary air into the exhaust manifold 11, thereby preventing overheating of the exhaust system. The air suction valve 17 is controlled, via a vacuum switch valve (not shown), by the control circuit 10 using the data of the engine speed $N_e$, the vehicle speed SPD, the idle switch LL, the coolant temperature THW and the like.

The control circuit 10, which may be constructed by a microcomputer, further comprises a central processing unit (CPU) 103, a read-only memory (ROM) 104 for storing a main routine and interrupt routines such as a fuel injection routine, an ignition timing routine, tables (maps), constants, etc., a random access memory 105 (RAM) for storing temporary data, a backup RAM 106, a clock generator 107 for generating various clock signals, a down counter 108, a flip-flop 109, a driver circuit 110, and the like.

Note, that the battery (not shown) is connected directly to the backup RAM 106 and, therefore, the content thereof is not erased even when the ignition switch (not shown ) is turned OFF.

The down counter 108, the flip-flop 109, and the driver circuit 110 are used for controlling the fuel injection valve 7. Namely, when a fuel injection amount TAU is calculated in a TAU routine, which will be later explained, the amount TAU is preset in the down counter 108, and simultaneously, the flip-flop 109 is set. As a result, the driver circuit 110 initiates the activation of the fuel injection valve 7. On the other hand, the down counter 108 counts up the clock signal from the clock generator 107, and finally generates a logic "1" signal from the borrow-out terminal of the down counter 108, to reset the flip-flop 109, so that the driver circuit 110 stops the activation of the fuel injection valve 7. Thus, the amount of fuel corresponding to the fuel injection amount TAU is injected into the fuel injection valve 7.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q of the airflow meter 3 and the coolant temperature data THW of the coolant sensor 9 are fetched by an A/D conversion routine(s) executed at predetermined intervals, and then stored in the RAM 105; i.e., the data Q and THW in the RAM 105 are renewed at predetermined intervals. The engine speed $N_e$ is calculated by an interrupt routine executed at 30° CA, i.e., at every pulse signal of the crank angle sensor 6, and is then stored in the RAM 105.

Figure 5B:
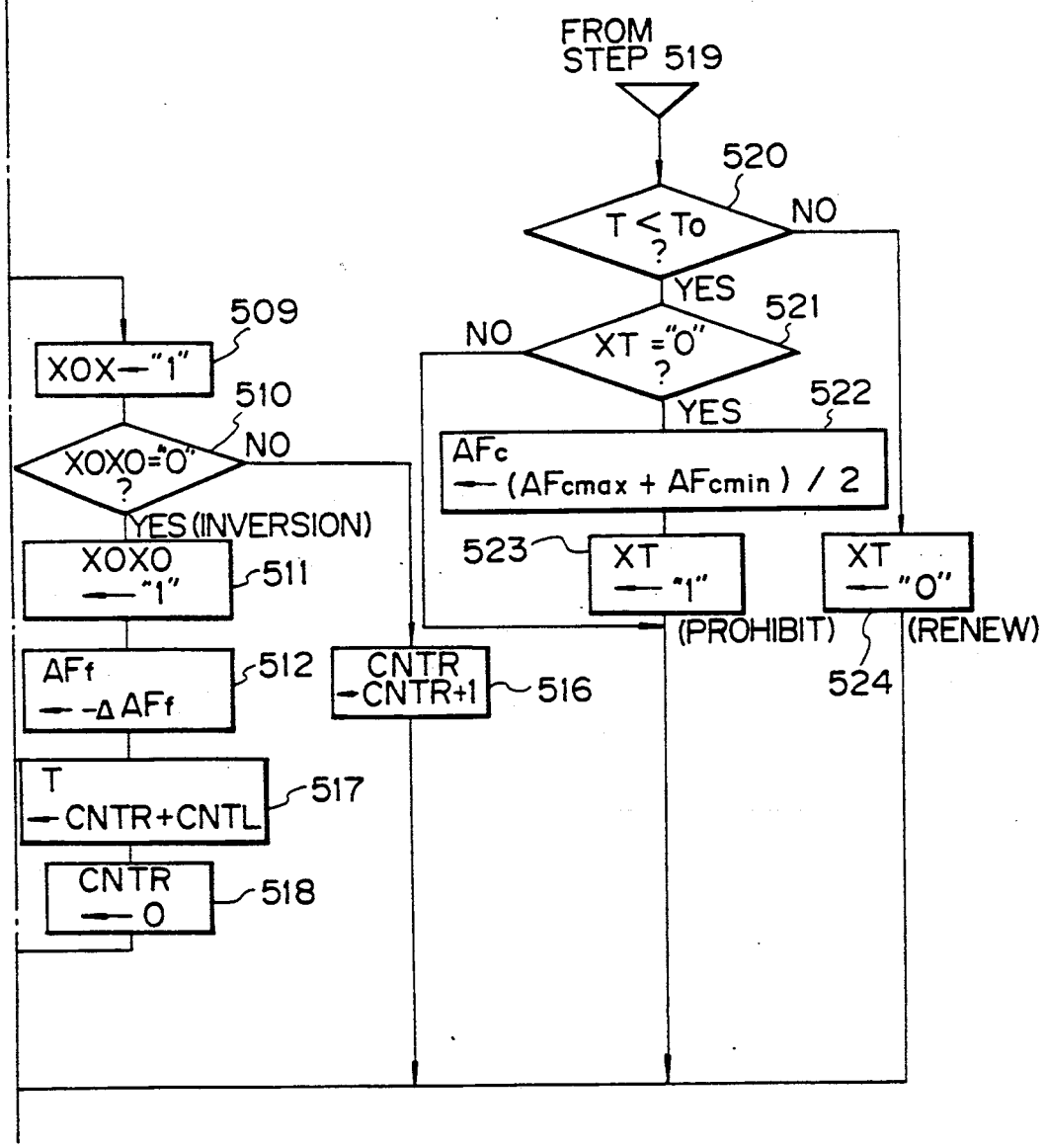

FIG. 5 is a routine for calculating a fine-adjusting term $AF_f$ in accordance with the output $V_{OX}$ of the $O_2$ sensor 14 and an inversion period (repetition period) of the $O_2$ sensor 14 executed at a predetermined time such as 4 ms.

At step 501, it is determined whether or not all of the feedback control (closed-loop control) conditions by the $O_2$ sensor 14 are satisfied. The feedback control conditions are as follows.

i) the coolant temperature THW is higher than 40° C.;
ii) the engine is not in a starting state;
iii) the engine is not in a fuel incremental state after a starting state;
iv) the power fuel incremental amount FPOWER is 0, i.e., the full switch VL of the throttle sensor 17 is turned OFF;
v) the engine is not in a fuel cut-off state;
vi) the $O_2$ sensor 14 is in an activated state; and
vii) the secondary air-suction in accordance the output LL of the idle switch, and the coolant temperature THW, and the like is not carried out.

Note that the determination of activation/non-activation of the $O_2$ sensor 14 is carried out by determining whether or not the output voltage $V_{OX}$ of the $O_2$ sensor 14 is lower than a predetermined value. Of course, other feedback control conditions are introduced as occasion demands, but an explanation of such other feedback control conditions is omitted.

Figure 7:
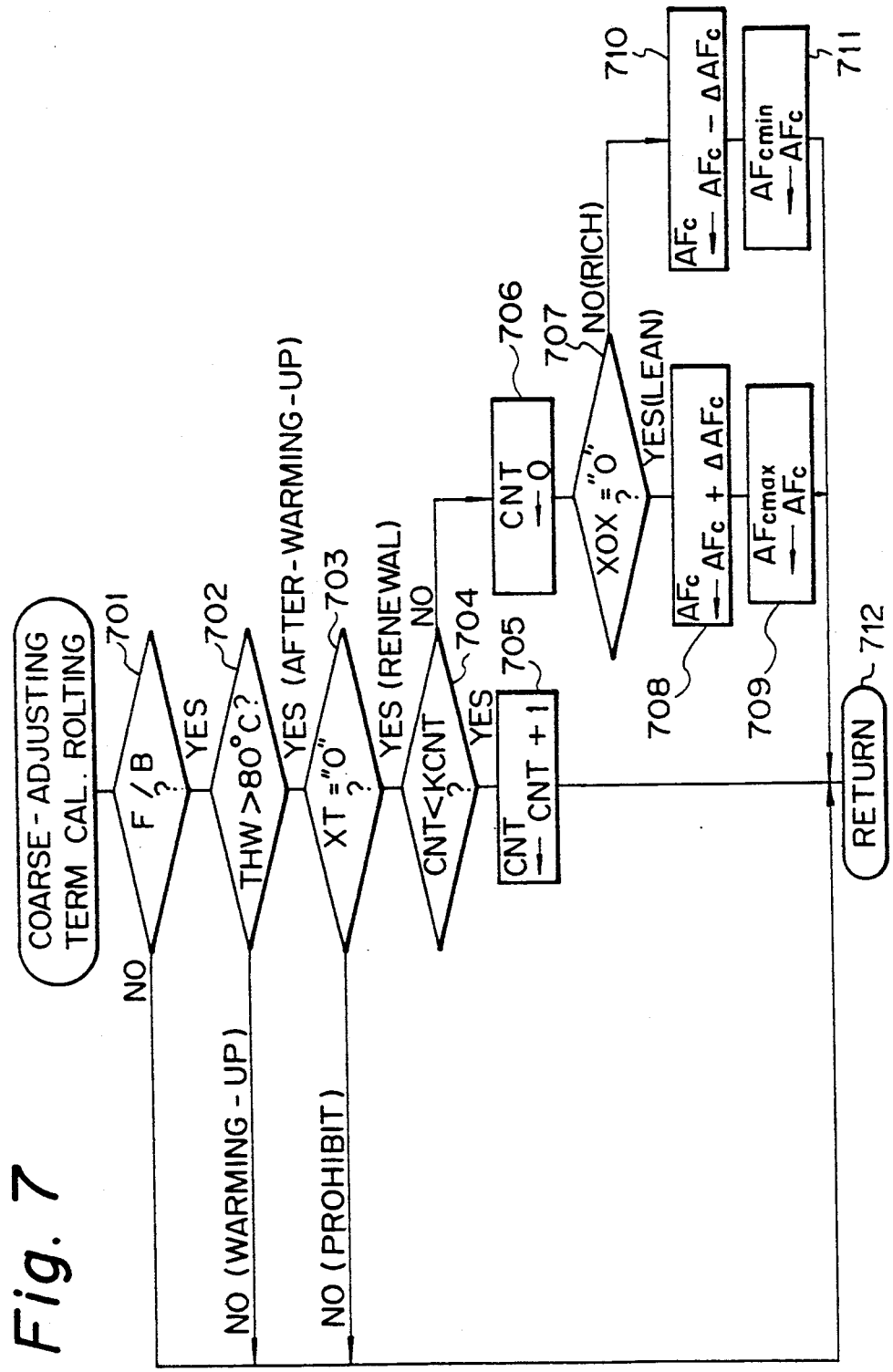

If one or more of the feedback control conditions is not satisfied, the control proceeds via step 525 to step 526, to thereby carry out an open-loop control operation. That is, at step 525, renewal prohibit flag XT for a coarse-adjusting $AF_c$, which will be later explained in FIG. 7, is reset, i.e., initialized.

Contrary to the above, at step 501, if all of the feedback control conditions are satisfied, the control proceeds to step 502 which determines whether the engine is in a warming-up or in an after-warming-up mode, by the coolant temperature THW. For example, if THW≦80° C., the engine is deemed to be in a warming-up mode, and if THW>80° C., the engine is deemed to be in an after-warming-up mode. As a result, if the engine is in a warming-up mode (THW≦80° C.), the control proceeds via step 525 to step 526. On the other hand, if the engine is in is an after-warming-up mode (THW>80° C.), the control proceeds to steps 503 to 524. Steps 503 to 512 are used for calculating a fine-adjusting term $AF_f$, and steps 513 to 519 are used for calculating a repetition period T of the output $V_{OX}$ in an idling state. Step 511 is used for declaring that a purge of the $O_2$ sensor 14 is completed by the inversion of the output $V_{OX}$ of the $O_2$ sensor 14, which will be later explained with reference to FIGS. 10A and 10B. Steps 520 to 524 are used for determining whether the calculation of the coarse-adjusting $AF_c$ is prohibited or carried out.

Steps 503 to 512 are explained below.

At step 503, and A/D conversion is performed upon the output voltage $V_{OX}$ of the $O_2$ sensor 14, and the A/D converted value thereof is then fetched from the A/D converter 101. Then at step 504, the voltage $V_{OX}$ is compared with a reference voltage $V_R$ such as 0.45 V, thereby determining whether the current air-fuel ratio detected by the O$_2$ sensor 14 is on the rich side or on the lean side with respect to the stoichiometric air-fuel ratio.

Figure 6:
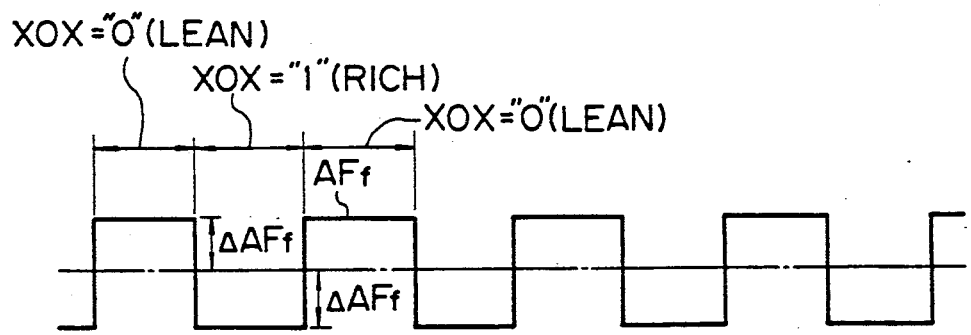
FIG. 6 is a timing diagram explaining the flow chart of FIG. 5.

If $V_{OX} \leq V_R$, which means that the current air-fuel ratio is lean, the control proceeds to step 505, which sets "0" in an air-fuel ratio flag XOX. At step 506, it is determined whether or not a previous air-fuel ratio flag XOXO is "1" (rich), i.e., the air-fuel ratio flag XOX is inverted. As a result, only when the air-fuel ratio flag XOX is inverted does the control proceed to step 507, which inverts the previous air-fuel ratio flag XOXO, and then at step 508, the fine-adjusting term AF$_f$ is made $\Delta$AF$_f$ (definite) as shown in FIG. 6. Then the control proceeds to step 514.

On the other hand, at step 504, $V_{OX} > V_R$, which means that the current air-fuel ratio is rich, the control proceeds to step 509, which sets "1" in the air-fuel ratio flag XOX. At step 510, it is determined whether or not the previous air-fuel ratio flag XOXO is "0" (lean), i.e., the air-fuel ratio flag XOX is inverted. As a result, only when the air-fuel ratio flag XOX is inverted does not the control proceed to step 511 which inverts the previous air-fuel ratio flag XOXO, and then at step 512, the fine-adjusting term AF$_f$ is made $-\Delta$AF$_f$ (definite) as shown in FIG. 6. Then the control proceeds to step 517.

Thus, according to steps 503 to 512 of FIG. 5, the fine-adjusting term AF$_f$ has a waveform which is skipped at every reversion of the output $V_{OX}$ of the O$_2$ sensor 14 as shown in FIG. 6. Namely, the control of the fine-adjusting term AF$_f$ corresponds to a skip control, and thus, a self-oscillating waveform is formed by the output $V_{OX}$ of the O$_2$ sensor 14 per se.

Steps 513 to 518 are explained below.

When the flag XOX is not inverted at step 506, the control proceeds to step 513 which measures a lean state duration by counting up a counter value CNTL by +1. Similarly, when the flag XOX is not inversed at step 510, the control proceeds to step 516 which measures a rich state duration by counting up a counter value CNTR by +1.

At step 514, a repetition period T of the output $V_{OX}$ of the O$_2$ sensor 14 is calculated by

T←CNTL+CNTR

Then, at step 515, the counter value CNTL is cleared, and the control proceeds to step 519. Similarly, at step 517, a repetition period T of the output $V_{OX}$ of the O$_2$ sensor 14 is calculated by

T←CNTR+CNTL

Then, at step 518, the counter value CNTR is cleared, and the control proceeds to step 519.

At step 519, a counter value CNT for calculating the coarse-adjusting term AF$_c$, which will be later explained in FIG. 7, is cleared.

At step 522, since the output $V_{OX}$ of the O$_2$ sensor 14 is inverted in an idling state, which means that a purge of the O$_2$ sensor 14 is completed, an on-purge flag XP is reset. Note, after the flag XP is reset, the flag XP is not set again in an idling state.

Steps 520 to 524 are explained below.

At step 520, the repetition period T of the O$_2$ sensor 14 calculated at step 514 or 517 is compared with a predetermined time T$_0$. As a result, if T<T$_0$, the control proceeds to steps 521 to 523 which prohibit the renewal of the coarse-adjusting term AF$_c$, while if T$\geq$T$_0$, the control proceeds to step 524 which renews the coarse-adjusting term AF$_c$. That is, at step 521, it is determined whether or not the renewal/prohibit flag XT is "0". Only when XT="0" does the control proceed to step 522, which holds the coarse-adjusting term AF$_c$ at an intermediate value between maximum and minimum values of the coarse-adjusting term AF$_c$ immediately before the calculation of the coarse-adjusting term AF$_c$ is prohibited. That is, AF$_c$←(AF$_{c\ max}$+AF$_{c\ min}$)/2

Then, at step 523, the flag XT is set (XT="1"), thus carrying out step 522 only one time when T<T$_0$. Thus, thereafter, the coarse-adjusting term AF$_c$ is held at such an intermediate value. On the other hand, if T$\geq$T$_0$ at step 520, the control proceeds to step 524 which resets the renewal/prohibit flag XT (XT="0"), thus enabling the renewal of the coarse-adjusting term AF$_c$.

Then, the routine of FIG. 5 is completed by step 526.

FIG. 7 is a routine for calculating a coarse-adjusting term AF$_c$ executed at a predetermined internal such as 64 ms.

At step 701, it is determined whether or not all of the feedback control conditions are satisfied, as at step 501 of FIG. 5. Note that one of these conditions is a determination of whether or not a predetermined time has passed after a fuel cut-off operation is stopped. As a result, when one or more of the feedback control conditions are not satisfied, the control proceeds directly to step 712. When all of the feedback control conditions are satisfied, the control proceeds to step 702.

At step 702, it is determined whether the engine is in a warming-up mode (THW$\leq$80° C.) or in an after-warming-up mode (THW>80° C.). When the engine is in an after-warming-up mode, the control proceeds to step 703. Conversely, when the engine is in a warming-up mode, the control proceeds directly to step 712, thus prohibiting the calculation of the coarse-adjusting term AF$_c$.

At step 703, it is determined whether or not XT="0" is satisfied, i.e., whether the calculation of the coarse-adjusting term AF$_c$ is to be carried out or (XT="0") to be prohibited (XT="0"). Note that the renewal/prohibition flag XT is cleared when the repetition time T is longer than T$_0$ (T$\geq$T$_0$) as explained above. As a result, only if the renewal/prohibition flag XT is "0" does the control proceed to step 704. Otherwise, the control proceeds to step 712.

At step 704, it is determined whether or not the counter value CNT has reached a definite value KCNT. Note that the counter value CNT is cleared at every inversion of the output $V_{OX}$ of the O$_2$ sensor 14 at step 519 of FIG. 5. Therefore, first, the control at step 704 proceeds to step 705, which counts up the counter value CNT by +1, and then the control proceeds to step 712. Conversely, when the counter value CNT reaches the definite value KCNT, i.e., a predetermined time 64 ms×KCNT has passed, the control at step 704 proceeds to steps 706 to 711.

At step 706, the counter value CNT is cleared. Then, at step 707, it is determined whether or not XOX="0", i.e., whether the current air-fuel ratio downstream of the catalyst converter 12 is rich ("1") or lean ("0"). As a result, as shown in FIG. 8, if lean ("0"), the control proceeds to step 708 which increases the coarse-adjusting term $AF_c$ by $\Delta AF_c$ (definite), and at step 709, the maximum value $AF_{c\,max}$ is renewed by $AF_c$. On the other hand, if rich ("1"), the control proceeds to step 710 which decreases the coarse-adjusting term $AF_c$ by $\Delta AF_c$, and at step 711, the minimum value $AF_{c\,min}$ is renewed by $AF_c$. Then, the control proceeds to step 712.

Note that the definite value $\Delta AF_c$ is smaller than the skip amount $\Delta AF_f$ at steps 508 and 512. Also, the maximum value $AF_{c\,max}$ and the minimum value $AF_{c\,min}$ are used in the calculation of the hold value of the coarse-adjusting term $AF_c$ carried out at step 522 of FIG. 5.

Figure 9B:
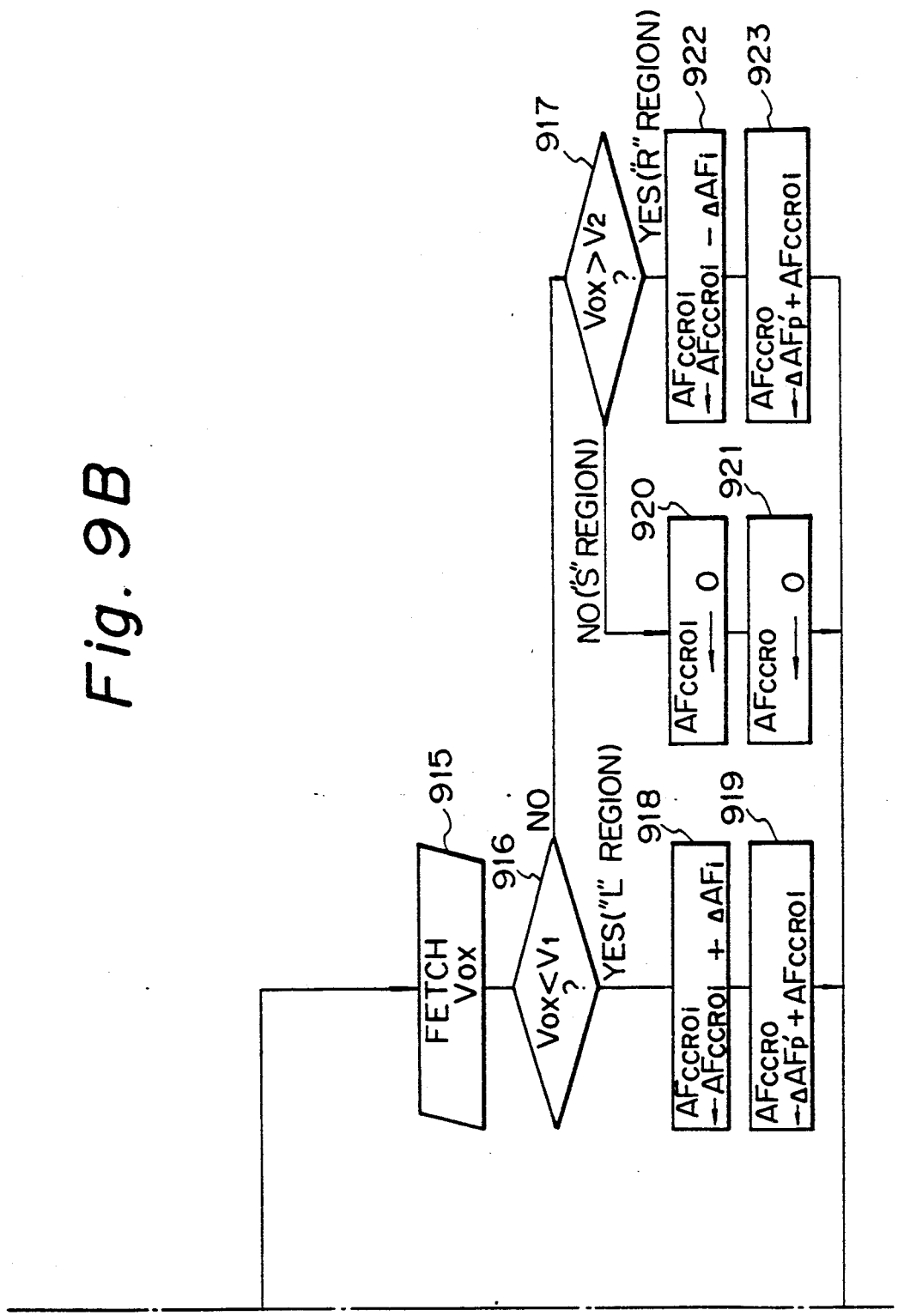

In FIG. 9, which is a routine for calculating an $O_2$ storage term $AF_{CCRO}$ executed at a predetermined time such as 16 ms, at step 901, it is determined whether or not all of the air-fuel ratio feedback control conditions are satisfied, in the same way as at step 501 of FIG. 5. As a result, when one or more of the air-fuel ratio feedback conditions are not satisfied, the control proceeds directly to step 924, and when all of the air-fuel ratio feedback conditions are satisfied, the control proceeds to step 902.

At step 902, it is determined whether the engine is in a warming-up mode (THW≦80° C.) or in an after-warming-up mode (THW>80° C.). When the engine is in a warming-up mode, the control proceeds to steps 903 through 914, which calculate an $O_2$ storage term $AF_{CCRO}$ for a warming-up mode. Conversely, when the engine is in an after-warming-up mode, the control proceeds to steps 915 through 923, which calculate an $O_2$ storage term $AF_{CCRO}$ for an after-warming-up mode.

Steps 903 through 914 are explained below.

At step 903, the output $V_{OX}$ of the $O_2$ sensor 14 is fetched, and an A/D conversion is performed upon the output $V_{OX}$. At step 904 the voltage $V_{OX}$ is compared with the reference volta $V_R$ such as 0.45 V, thereby determining whether the current air-fuel ratio detected by the $O_2$ sensor 14 is on the rich side or on the lean side with respect to the stoichiometric air-fuel ratio. As a result, if $V \leq V_R$ (lean), the control proceeds to step 905, which sets "0" in the air-fuel ratio flag XOX, and at step 906, it is determined whether or not the previous air-fuel ratio flag XOXO is "1" (rich). As a result, when the air-fuel ratio is switched from "1" (rich) to "0" (lean), the previous air-fuel ratio flag XOXO is inverted at step 907, and the $O_2$ storage term $AF_{CCRO}$ is calculated at step 907 by $$AF_{CCRO} \leftarrow AF_{CCRO} + \Delta AF_p \text{ (skip amount)}$$

That is, the $O_2$ storage term $AF_{CCRO}$ is remarkably increased by the skip amount $\Delta AF_p$. Otherwise, the control proceeds to step 909, which gradually increases the $O_2$ storage term $AF_{CCRO}$ by $$AF_{CCRO} \leftarrow AF_{CCRO} + \Delta AF_i \text{ (integration amount)}$$

In this case, $$\Delta AF_p > \Delta AF_i$$

On the other hand, at step 904, if $V > V_R$ (rich), the control proceeds to step 910 which sets "1" in the air-fuel ratio flag XOX, and at step 911, it is determined whether or not the previous air-fuel ratio flag XOXO is "0" (lean). As a result, when the air-fuel ratio is switched from "0" (lean) to "1" (rich), the previous air-fuel ratio flag XOXO is inverted at step 912, and the $O_2$ storage term is calculated at step 913 by $$AF_{CCRO} \leftarrow AF_{CCRO} - \Delta AF_p$$

That is, the $O_2$ storage term $AF_{CCRO}$ is remarkably decreased by the skip amount $\Delta AF_p$. Otherwise, the control proceeds to step 914 which gradually decreases the $O_2$ storage term $AF_{CCRO}$ by $$AF_{CCRO} \leftarrow AF_{CCRO} - \Delta AF_i$$

Steps 915 through 923 are explained below.

At step 915, the output $V_{OX}$ of the $O_2$ sensor 14 is fetched, and an A/D conversion is performed upon the output $V_{OX}$.

At steps 916 and 917 the output $V_{OX}$ of the $O_2$ sensor 14 is determined. Here, as shown in FIG. 10A, the output $V_{OX}$ of the $O_2$ sensor 14 is also divided into three regions:

0–$V_1$ (lean ("L") region)
$V_1$–$V_2$ (stoichiometric ("S") region)
$V_2$–1.0 V (rich ("R") region)

Therefore, at steps 916 and 917, it is determined to what region the output $V_{OX}$ of the $O_2$ sensor 14 belongs, and as a result, if $0 \leq V_{OX} \leq V_1$ ("L" region), the control proceeds to step 918 which calculates the integration term $AF_{CCROi}$ of the $O_2$ storage term $AF_{CCRO}$ by $$AF_{CCROi} \leftarrow AF_{CCROi} + \Delta AF'_i \text{ (definite value)}$$

Then, at step 919, the $O_2$ storage term $AF_{CCRO}$ is calculated by $$AF_{CCRO} \leftarrow \Delta AF'_p + AF_{CCROi}$$

Here, $\Delta AF'_p$ is a skip $O_2$ storage amount, and the following condition is satisfied:

$$\Delta AF'_p > \Delta AF'_i$$

That is, in the "L" region, as shown in FIG. 10B, an air-fuel ratio correction amount FAF, which is dependent on $AF_f + AF_c + AF_{CCRO}$ (see: step 1102 of FIG. 11), is shifted down by the amount $\Delta AF'_p$, and thereafter, is gradually decreased at an integration speed $\Delta AF_i$.

If $V_1 < V_{OX} < V_2$ ("S" region), the control proceeds to step 920 which calculates the integration term $AF_{CCROi}$ of the $O_2$ storage term $AF_{CCRO}$ by $$AF_{CCROi} \leftarrow 0$$

Then, at step 921, the $O_2$ storage term $AF_{CCRO}$ is calculated by $AF_{CCRO} \leftarrow 0$ That is, in the "S" region, as shown in FIG. 10B, the air-fuel ratio correction amount FAF is dependent on only the sum of $AF_f$ and $AF_c$.

If $V_2 \leq V_{OX} \leq 1.0$ V, the control proceeds to step 922 which calculates the integration term $AF_{CCROi}$ of the $O_2$ storage term $AF_{CCRO}$ by $AF_{CCROi} \leftarrow AF_{CCROi} - \Delta AF'_i$ Then, at step 923, the $O_2$ storage term $AF_{CCRO}$ is calculated by $AF_{CCRO} \leftarrow -\Delta AF'_p + AF_{CCROi}$ That is, in the "R" region, as shown in FIG. 10B, the air-fuel ratio correction amount FAF is shifted up by the amount $\Delta AF'_p$ and thereafter, is increased at the integration speed $\Delta AF_i$.

Then, this routine is completed by step 924.

Note that the relationship between the skip amount $\Delta AF_p$ in a warming-up mode and the skip amount $\Delta AF'_p$ in an after-warming-up mode satisfies the following:

$\Delta AF_p < \Delta AF'_p$

That is, a remarkable fluctuation of the controlled air-fuel ratio in a warming-up mode may lead to a worsening of the drillability, and therefore, the skip amount $\Delta AF_p$ is smaller than $\Delta AF'_p$.

Also, in view of the fact that the amount of fuel adhered to the walls of the intake air pipe and the like is larger in a warming-up mode than in an after-warming-up mode, the relationship between the integration amount $\Delta AF_i$ in a warming-up mode and the integration amount $\Delta AF'_i$ in an after-warming-up mode satisfies the following:

$\Delta AF_i < \Delta AF'_i$

Thus, the $O_2$ storage term $AF_{CCRO}$ in the warming-up mode is not cleared at every inversion of the output $V_{OX}$ of the $O_2$ sensor 14, and therefore, is reflected by the previous state of the $O_2$ storage term $AF_{CCRO}$. As a result, as shown in FIGS. 3A and 3B, even when a temporary lean output is generated from the $O_2$ sensor 14, the $O_2$ storage term $AF_{CCRO}$ is held at a lean-side level. Therefore, the overrich air-fuel ratio due to the increase of fuel adhered to the walls of the intake air pipe and the like in a warming-up mode can be avoided.

Note that, although the number of regions of the output $V_{OX}$ of the $O_2$ sensor 14 in FIG. 9 is two for calculating the $O_2$ storage term $AF_{CCRO}$ in a warming-up mode, the number of regions can be more than two. For example, if such regions are the "L" region, the "S" region, and the "R" region, the $O_2$ storage term $AF_{CCRO}$ in a warming-up mode is held when the output $V_{OX}$ of the $O_2$ sensor 14 belongs to the "S" region.

On the other hand, since the $O_2$ storage term $AF_{CCRO}$ for an after-warming-up mode is cleared by steps 920 and 921 of FIG. 9, the $O_2$ storage amount of the catalyst converter 12 is directly reflected at the $O_2$ storage term $AF_{CCRO}$.

Figure 11:
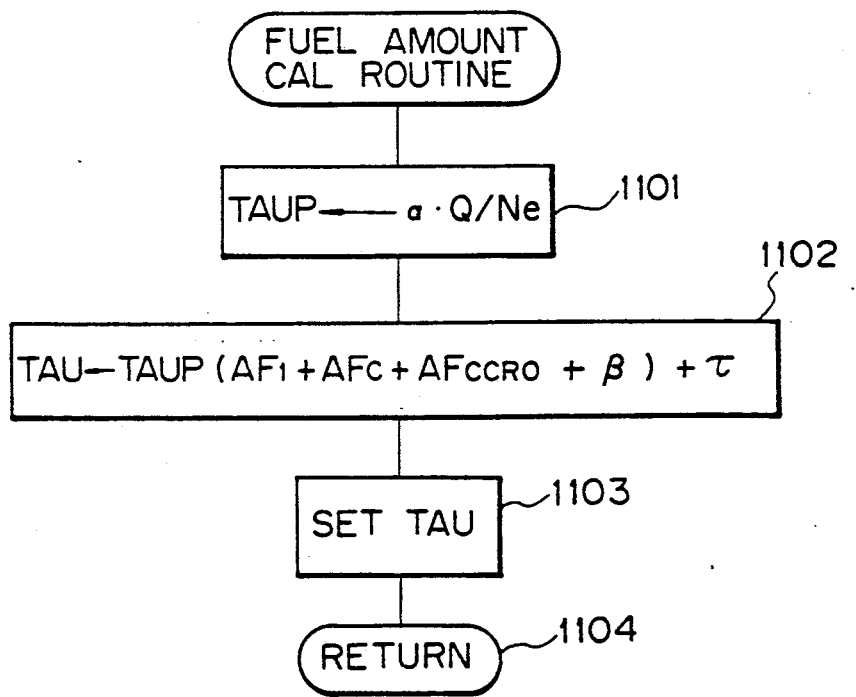

FIG. 11 is a routine for calculating a fuel injection amount TAU executed at a predetermined crank angle such as 360° CA.

At step 1101, a base fuel injection amount TAUP is calculated by using the intake air amount data Q and the engine speed data $N_e$ stored in the RAM 105. That is, TAUP $\leftarrow \alpha \cdot Q/N_e$ where $\alpha$ is a constant. At step 1102, a final fuel injection amount TAU is calculated by $$TAU \leftarrow TAUP \cdot (AF_f + AF_c + AF_{CCRO} + \beta) + \gamma$$

where $\beta$ and $\gamma$ are correction factors determined by other parameters such as the voltage of the battery and the temperature of the intake air. At step 1103, the final fuel injection amount TAU is set in the down counter 107, and in addition, the flip-flop 108 is set to initiate the activation of the full injection valve 7. This routine is completed by step 1104. Note that, as explained above, when a time corresponding to the amount TAU has passed, the flip-flop 109 is reset by the borrow-out signal of the down counter 108 to stop the activation of the fuel injection valve 7.

Figure 12:
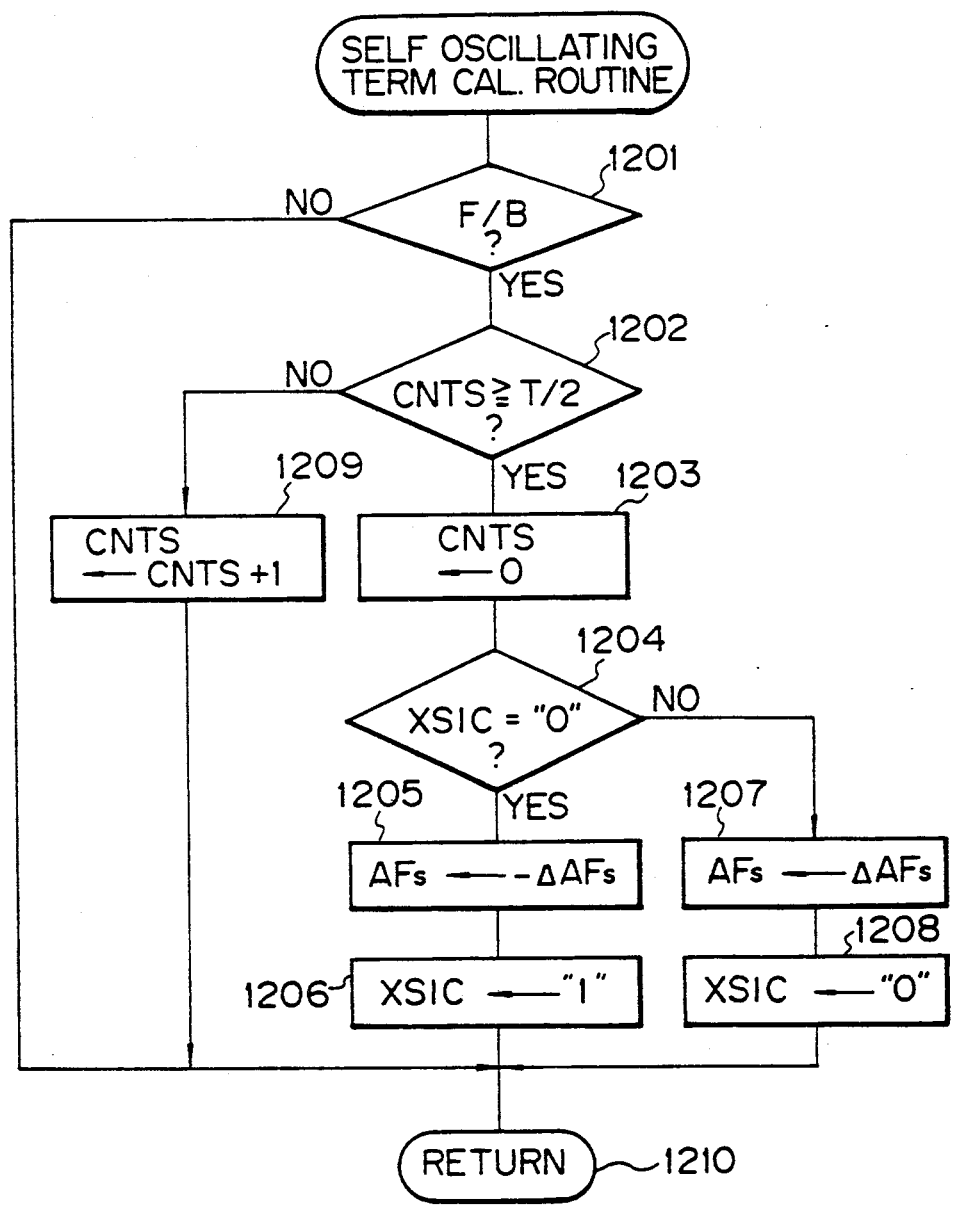

In FIG. 12, which is a routine for calculating a self-oscillating term $AF_s$ executed at a time such as 4 ms, at step 1201 it is determined whether or not all of the air-fuel ratio feedback conditions are satisfied in the same way as at step 501 of FIG. 5. As result, when one or more of the air-fuel ratio feedback conditions are not satisfied, the control proceeds directly to step 1210, and if all of the air-fuel ratio feedback conditions are satisfied, the control proceeds to steps 1202 to 1208.

At step 1202, it is determined whether or not a counter value CNTS has reached T/2, where T is a period of the self-oscillating term $AF_s$. That is, since the counter value CNTS is counted up by +1 at step 1208, the control at step 1203 proceeds to steps 1203 to 1209 at every time T/2. At step 1205, the counter value CNTS is cleared, and then at step 1205, it is determined whether or not a self-oscillating flag XSIC is "0". As a result, when XSIC="0", the control proceeds to step 1206 which causes the self-oscillating term $AF_s$ to be $-\Delta AF_s$ (definite value), thus inverting the self-oscillating flag XSIC at step 1207. As a result, the counter value CNTS again reaches T/2 and the control at step 1204 proceeds to step 1208, which causes the self-oscillating term $AF_s$ to be $\Delta AF_s$, thus inverting the self-oscillating flag XSIC at step 1209.

Then, this routine is completed by step 1210.

Figure 13:
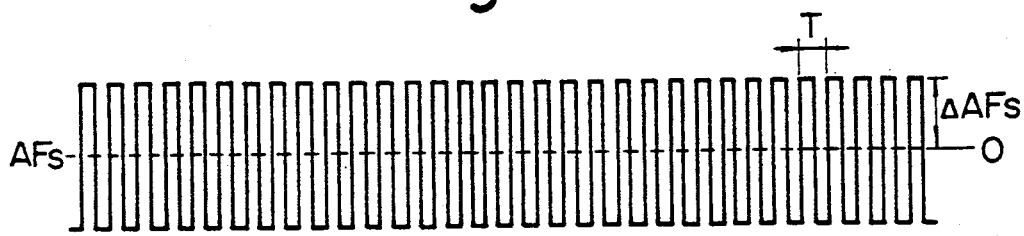

Thus, according to the routine of FIG. 12, a self-oscillating waveform $AF_s$ having a definite amplitude ($\Delta AF_s$) and a definite period (T), as shown in FIG. 13, is generated.

Figure 14:
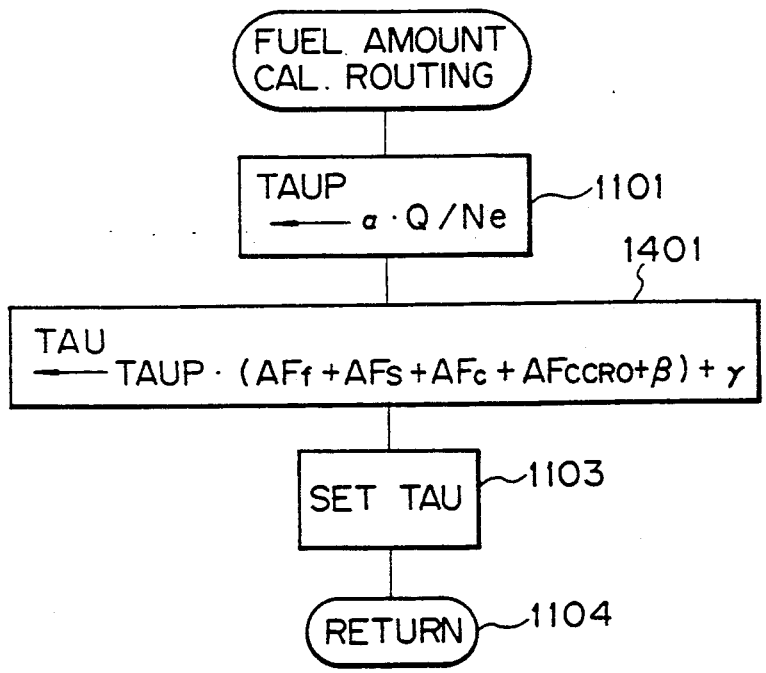

In FIG. 14, which is also a routine for calculating a fuel injection amount TAU, a step 1401 is provided instead of the step 1102 of FIG. 11. That is, a final fuel injection amount TAU is calculated by $$TAU \leftarrow TAUP \cdot (AF_f + AF_s + AF_c + AF_{CCRO} + \beta) + \gamma$$

Namely, the self-oscillating term $AF_s$ also serves as the fine-adjusting term $AF_f$. In this case, the amplitude ($\Delta AF_s$) and frequency (T) of the self-oscillating term $AF_s$ are designed to minimize the fluctuation of the air-fuel ratio due to the introduction of the self-oscillating term $Af_s$ into the control of the air-fuel ratio.

Note that, although the fine-adjusting term $AF_f$ is introduced into the control of the air-fuel ratio in the above-mentioned embodiments, the air-fuel ratio can be controlled only in accordance with the coarse-adjusting term $AF_c$ and the $O_2$ storage term $Af_{CCRO}$.

Note that the present invention can be applied to a single $O_2$ sensor system where the $O_2$ sensor 14' is located within the catalyst converter 12, as explained above.

Also, a Karman vortex sensor, a heat-wire type flow sensor, and the like can be used instead of the airflow meter.

Although in the above-mentioned embodiments, a fuel injection amount is calculated on the basis of the intake air amount and the engine speed, it can be also calculated on the basis of the intake air pressure and the engine speed, or the throttle opening and the engine speed.

Further, the present invention can be also applied to a carburetor type internal combustion engine in which the air-fuel ratio is controlled by an electric air control value (EACV) for adjusting the intake air amount; by an electric bleed air control valve for adjusting the air bleed amount supplied to a main passage and a slow passage; or by adjusting the secondary air amount introduced into the exhaust system. In this case, the base fuel injection amount corresponding to TAUP at step 1101 of FIG. 11 or step 1401 of FIG. 14 is determined by the carburetor itself, i.e., the intake air negative pressure and the engine speed, and the air amount corresponding to TAU is calculated at step 1102 of FIG. 11 or step 1405 of FIG. 14.

Further, a CO sensor, a lean-mixture sensor or the like can be also used instead of the $O_2$ sensor.

As explained above, according to the present invention, since the $O_2$ storage term $AF_{CCRO}$ for a warming-up mode is weakly dependent on the $O_2$ storage amount of the catalyst converter, an original rich fuel ratio in a warming-up mode can be compensated, and therefore, an overrich state of the air-fuel ratio in a warming-up mode can be avoided. In addition, since the $O_2$ storage term $AF_{CCRO}$ in an after-warming-up mode is strongly dependent on the $O_2$ storage amount of the catalyst converter, the convergence of the controlled air-fuel ratio to the stoichiometric air-fuel ratio in an after-warming-up mode can be maintained, thus avoiding the increase of the emissions and exhibiting an excellent cleaning of the catalyst converter.

What is claimed:

1. A method of controlling an air-fuel ratio in an internal combustion engine having a three-way catalyst converter for removing pollutants in the exhaust gas of said engine, and an air-fuel ratio sensor, disposed downstream of or within said three-way catalyst converter, for detecting a specific component in the exhaust gas, comprising the steps of:

determining whether said engine is in a warming-up mode or an after-warming-up mode;

gradually changing a warming-up $O_2$ storage term to the rich side when the output of said air-fuel ratio sensor is on the lean side with respect to the stoichiometric air-fuel ratio, and said engine is in the warming-up mode;

gradually changing said warming-up $O_2$ storage term to the lean side when the output of said air-fuel ratio sensor is on the rich side with respect to the stoichiometric air-fuel ratio, and said engine is in the warming-up mode;

calculating a coarse-adjusting term at an integration speed in accordance with the output of said air-fuel ratio sensor, when said engine is in the after-warming-up mode;

calculating an after-warming-up $O_2$ storage term corresponding to an $O_2$ storage amount of said three-way catalyst converter, when said engine is in the after-warming-up mode;

adjusting an actual air-fuel ratio in accordance with said warming-up $O_2$ storage term, when said engine is in the warming-up mode; and adjusting the actual air-fuel ratio in accordance with said coarse-adjusting term and said after-warming-up $O_2$ storage term, when said engine is in the after-warming-up mode.

2. A method as set forth in claim 1, further comprising the steps of:

greatly changing said warming-up $O_2$ storage term to the rich side when the output of said air-fuel ratio sensor is switched from the rich side to the lean side and said engine is in the warming-up mode; and greatly changing said warming-up $O_2$ storage term to the lean side when the output of said air-fuel ratio sensor is switched from the lean side to the rich side and said engine is in the warming-up mode.

3. A method as set forth in claim 1, wherein said after-warming-up $O_2$ storage term calculating step makes said after-warming-up $O_2$ storage term large when the $O_2$ storage amount of said three-way catalyst converter is large and makes said after-warming-up $O_2$ storage term small when the $O_2$ storage amount of said three-way catalyst converter is small.

4. A method as set forth in claim 1, wherein said after-warming-up $O_2$ storage term calculating step comprises the steps of:

determining whether said engine is in a lean air-fuel ratio region, in a stoichiometric air fuel ratio region, or in a rich air-fuel ratio region, by the output of said air-fuel ratio sensor;

setting a positive value in said after-warming-up $O_2$ storage term when the engine is in said lean air-fuel ratio region;

setting a negative value in said after-warming-up $O_2$ storage term when the engine is in said rich air-fuel ratio region; and resetting said after-warming-up $O_2$ storage term when the engine is in said stoichiometric air-fuel ratio region.

5. A method as set forth in claim 4, wherein said after-warming-up $O_2$ storage term calculating step further comprises the steps of:

gradually increasing said after-warming-up $O_2$ storage term when the engine is in said lean air-fuel ratio region; and gradually decreasing said after-warming-up $O_2$ storage term when the engine is in said rich air-fuel ratio region.

6. A method as set forth in claim 1, further comprising a step of generating a self-oscillating term having a predetermined amplitude and a predetermined time, said air-fuel ratio adjusting step adjusting said actual air-fuel ratio in accordance with said self-oscillating term.

7. A method as set forth in claim 1, further comprising the steps of:

greatly changing said after-warming-up $O_2$ storage term to the rich side when the output of said air-fuel ratio sensor is switched from the rich side to the lean side and said engine is in the after-warming-up mode; and greatly changing said after-warming-up $O_2$ storage term to the lean side when the output of said air-fuel ratio sensor is switched from the lean side to the rich side and said engine is in the after-warming-up mode.

8. A method as set forth in claim 1, further comprising the steps of:

determining whether or not a repetition period of said air-fuel ratio sensor is smaller than a predetermined period, when said engine is in the after-warming-up mode; and prohibiting the calculation of said coarse-adjusting term when the repetition period of said air-fuel ratio sensor is smaller than the redetermined period.

9. A method as set forth on claim 8, wherein said prohibiting step holds said coarse-adjusting term at an intermediate value between the maximum and minimum, values of said coarse-adjusting term immediately before the prohibition of the calculation thereof.

10. An apparatus for controlling an air-fuel ratio in an internal combustion engine having a three-way catalyst converter for removing pollutants in the exhaust gas of said engine, and an air-fuel ratio sensor, disposed downstream of or within said three-way catalyst converter, for detecting a specific component in the exhaust gas, comprising means for determining whether said engine is in a warming-up mode or an after-warming-up mode;

means for gradually changing a warming-up $O_2$ storage term to the rich side when the output of said air-fuel ratio sensor is on the lean side with respect to the stoichiometric air-fuel ratio, and said engine is in the warming-up mode;

means for gradually changing said warming-up $O_2$ storage term to the lean side when the output of said air-fuel ratio sensor is on the rich side with respect to the stoichiometric air-fuel ratio, and said engine is in the warming-up mode;

means for calculating a coarse-adjusting term at an integration speed in accordance with the output of said air-fuel ratio sensor, when said engine is in the after-warming-up mode;

means for calculating an after-warming-up $O_2$ storage term corresponding to an $O_2$ storage amount of said three-way catalyst converter, when said engine is in the after-warming-up mode;

means for adjusting an actual air-fuel ratio in accordance with said warming-up $O_2$ storage term, when said engine is in the warming-up mode; and means for adjusting the actual air-fuel ratio in accordance with said coarse-adjusting term and said after-warming-up $O_2$ storage term, when said engine is in the after-warming-up mode;

11. An apparatus as set forth in claim 10, further comprising:

means for greatly changing said warming-up $O_2$ storage term to the rich side when the output of said air-fuel ratio sensor is switched from the rich side to the lean side and said engine is in the warming-up mode; and;

means for greatly changing said warming-up $O_2$ storage term to the lean side when the output of said air-fuel ratio sensor is switched from the lean side to the rich side and said engine is in the warming-up mode.

12. An apparatus as set forth in claim 10, wherein said after-warming-up $O_2$ storage term calculating means makes said after-warming-up $O_2$ storage term large when the $O_2$ storage amount of said three-way catalyst converter is large and makes said after-warming-up $O_2$ storage term small when the $O_2$ storage amount of said three-way catalyst converter is small.

13. An apparatus as set forth in claim 10, wherein said after-warming-up $O_2$ storage term calculating means comprises the steps of:

means for determining whether said engine is in a lean air-fuel ratio region, in a stoichiometric air fuel ratio region, or in a rich air-fuel ratio region, by the output of said air-fuel ratio sensor;

means for setting a positive value in said after-warming-up $O_2$ storage term when the engine is in said lean air-fuel ratio region;

means for setting a negative value in said after-warming-up $O_2$ storage term when the engine is in said rich air-fuel ratio region; and means for resetting said after-warming-up $O_2$ storage term when the engine is in said stoichiometric air-fuel ratio region.

14. An apparatus as set forth in claim 13, wherein said after-warming-up $O_2$ storage term calculating means further comprises;

means for gradually increasing said after-warming-up $O_2$ storage term when the engine is in said lean air-fuel ratio region; and means for gradually decreasing said after-warming-up $O_2$ storage term when the engine is in said rich air-fuel ratio region.

15. An apparatus as set forth in claim 10, further comprising mans for generating a self-oscillating term having a predetermined amplitude and a predetermined time, said air-fuel ratio adjusting means adjusting said actual air-fuel ratio in accordance with said self-oscillating term.

16. An apparatus as set forth in claim 10, further comprising:

means for greatly changing said after warming-up $O_2$ storage term to the rich side when the output of said air-fuel ratio sensor is switched from the rich side to the lean side and said engine is in the after warming-up mode; and means for greatly changing said after-warming-up $O_2$ storage term to the lean side when the output of said air-fuel ratio sensor is switched from the lean side to the rich side and said engine is in the after-warming-up mode.

17. An apparatus as set forth in claim 10, further comprising:

means for determining whether or not a repetition period of said air-fuel ratio sensor is smaller than a predetermined period, when said engine is in the after-warming-up mode; and means for prohibiting the calculation of said coarse-adjusting term when the repetition period of said air-fuel ratio sensor is smaller than the redetermined period.

18. An apparatus as set forth on claim 17, wherein said prohibiting means holds said coarse-adjusting term at an intermediate value between the maximum and minimum values of said coarse-adjusting term immediately before the prohibition of the calculation thereof.

* * * * *

UNITED STATES PATENT AND TRADEMARK OFFICE
CERTIFICATE OF CORRECTION

PATENT NO. : 5,070,692

DATED : December 10, 1991

INVENTOR(S) : Nada, Mitsuhiro

It is certified that error appears in the above-identified patent and that said Letters Patent is hereby corrected as shown below:

Title Page:

Abstract, line 6, change "$AF_{ccro}$," to --$AF_{ccro}'$-- line 9, change "$AF_{ccro}$," to --$AF_{ccro}'$--

Column 3, line 3, change "$AF_{ccro}$," to --$AF_{ccro'}$-- line 11, change "$AF'_{ccro}$" to --$AF_{ccro'}$--

Column 9, line 9, change "$\Delta AF_f$" to --$\Delta AF_f$-- line 37, change "volta" to --voltage-- line 31, change "$AF_{ccro}$" to --$AF_{ccro'}$-- lines 50 and 52, change "$AF_{ccro}$" to --$AF_{ccro}$-- lines 60 and 62, change "$AF_{ccro}$" to --$AF_{ccro}$--

Column 10, lines 10 and 13, change "$AF_{ccro}$" to --$AF_{ccro}$-- lines 20 and 23, change "$AF_{ccro}$" to --$AF_{ccro}$-- line 47, change "$AF_{ccro}$" to --$AF_{ccro}$--

UNITED STATES PATENT AND TRADEMARK OFFICE
CERTIFICATE OF CORRECTION

PATENT NO. : 5,070,692
DATED : December 10, 1991
INVENTOR(S) : Nada, Mitsuhiro

It is certified that error appears in the above-identified patent and that said Letters Patent is hereby corrected as shown below:

```
Column 12, line 33, change "1208" to -1209-
          line 34, change "1203 to 1209" to -1204 to 1208-
          line 35, change "1205" to -1203-
          line 3,  change "1205" to -1204-
          line 39, change "1206" to -1205-
          line 41, change "1207" to -1206-
          line 43, change "1208" to -1207-
          line 45, change "1209" to -1208-
```

Signed and Sealed this

Thirtieth Day of November, 1993

Attest:

BRUCE LEHMAN

Attesting Officer     Commissioner of Patents and Trademarks